March 30, 1926.

G. F. MURPHY

EXPANSION JOINT

Filed Dec. 23, 1925

1,579,129

Inventor
George F. Murphy

By Attorneys

Patented Mar. 30, 1926.

1,579,129

UNITED STATES PATENT OFFICE.

GEORGE F. MURPHY, OF PHILADELPHIA, PENNSYLVANIA.

EXPANSION JOINT.

Application filed December 23, 1925. Serial No. 77,255.

*To all whom it may concern:*

Be it known that I, GEORGE F. MURPHY, a citizen of the United States, residing at Philadelphia, in the county of Philadelphia and State of Pennsylvania, have made an Invention in Expansion Joints, of which the following is a specification.

This application is in part a continuation of my application, Serial No. 747,715, filed November 4, 1924.

The invention relates to expansion joints and has for one of its primary objects the provision of an improved joint of the guided type, the construction of which is simple, compact and inexpensive. Expansion joints of the guided type have heretofore been employed but these are of expensive and rather cumbersome construction, in consequence of which, their field of use is somewhat limited.

By my invention I propose to extend the field within which guided joints may be used and provide a joint which may be effectively substituted for such more expensive joints in many places.

I also propose a joint which may be packed while the line is hot and expanded and the joint contracted.

How the foregoing, together with such other objects and advantages as may hereinafter appear, or are incident to my invention, are realized, is illustrated in the accompanying drawings of the best embodiment of the invention now known to me, wherein—

Figure 1:
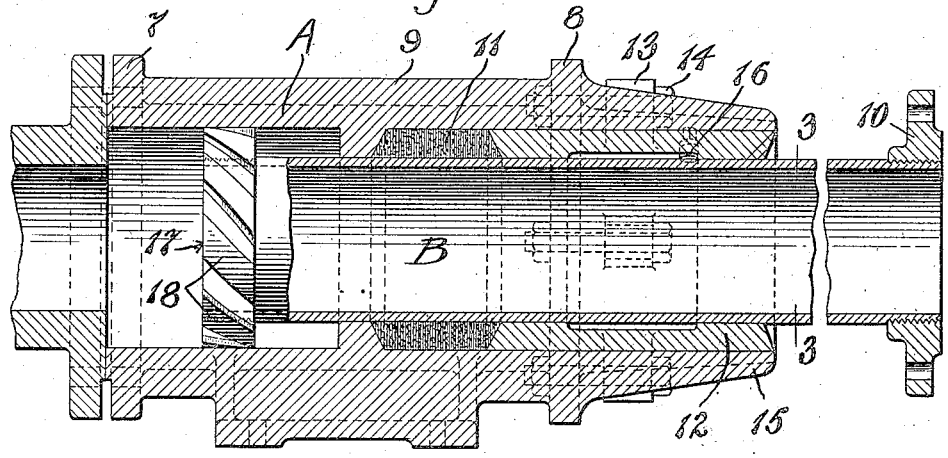
Figure 2:
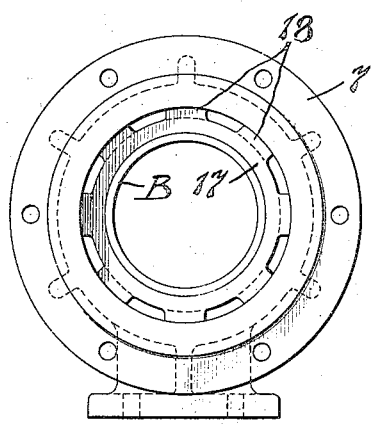
Figure 3:
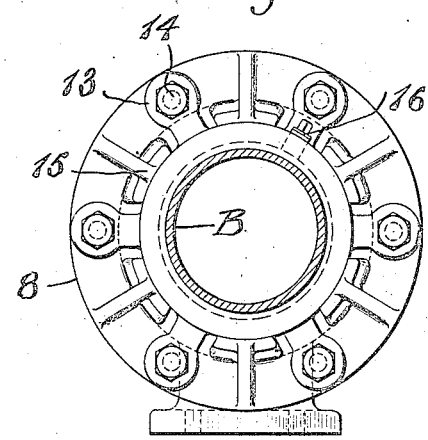

Fig. 1 is a longitudinal section through the joint made in accordance with my invention; and Fig. 2 is an end elevation of the joint of Fig. 1; and Fig. 3 is a section taken on the line 3—3 of Fig. 1.

Referring now to Fig. 1, the joint comprises a casing A, which is flanged at one end at 7, for connection into the pipe line, and flanged at the other end at 8 for the purpose of adjustably securing a combined stuffing box gland and guide, as will further appear. If desired the casing may be reinforced by a plurality of longitudinal ribs 9.

Telescopic within the casing A is a tubular member or pipe section B adapted to be connected to the pipe line by means of the collar 10.

The casing is so constructed on its interior as to cooperate with the pipe section to form a stuffing box joint, packed with suitable packing 11, which packing is adapted to be compressed by the combined gland and pipe section guide 12. It will be observed that this combined gland and guide is of substantial length, providing a bearing for the pipe section for a considerable portion of its length. In the embodiment shown the gland presents a bearing for the pipe to a point well removed from the base of the packing chamber and from the packing end of the gland and well beyond the flange 8 of the casing.

Intermediate its ends the gland is provided with a plurality of spaced radial lugs 13 apertured for the reception of the bolts 14 which are utilized to draw up the gland to compress the packing as may be required.

The casing has a plurality of peripherally spaced arms or fingers 15 projecting from its right hand end, such arms acting as a support for the free end of the gland preventing distortion and displacement. The lugs 13 lie in the spaces between arms.

The gland has its inner face cut out intermediate the ends, leaving a bearing surface at each end with an intermediate cavity which can be filled with grease or other lubricant by removing the plug 16.

At the inner end of the pipe B, a collar 17 is secured, preferably by threading. This collar slides within the casing and is provided with a plurality of diagonal ribs 18, each of which is adapted to approximately overlap the surface traversed by the adjacent ribs in order to prevent the wearing of grooves and relieve compression to cut down the expansion by reduction of the mass of metal of the guide collar. The spaces between ribs also provide for self-cleansing.

The construction is simple, compact and sturdy and the parts can be readily assembled. The collar 17 acts to limit the movement. The tubular member B has its free end extended to such a point that the coupling collar 10 is spaced far enough from the fingers 15 to permit of the combined gland and guide being slipped clear of the fingers to provide a free and unobstructed annular space to permit of the joint being packed with the line hot and expanded and the joint contracted, without otherwise disturbing the joint, which is of great practical value and advantage.

The spaces between fingers permit of air cooling of the gland which in turn improves lubricating conditions and reduces expansion of the gland and guide whereby a close fit is maintained than would otherwise be the case.

I claim:

1. An expansion joint comprising a casing, a pipe telescopic in the casing, a stuffing box joint and gland therefor, said gland having means intermediate its ends for adjustable attachment to the casing and having its free end bearing on the pipe well beyond said means, and a support for the free end of the gland.

2. An expansion joint comprising a casing, having a plurality of spaced fingers extending from an end thereof, a pipe telescopic in the casing, and a stuffing box joint and gland therefor, said gland having a plurality of spaced attaching members adapted to lie in the spaces between fingers, said fingers supporting the free end of the gland.

3. An expansion joint comprising a casing, a pipe telescopic in the casing, a stuffing box joint therebetween, and a combined gland for the joint and guide for the pipe together with means for adjusting the gland with respect to the casing and means for supporting the guide end of the gland from the casing.

4. In combination in an expansion joint, a casing, a pipe telescopic therein, a packed joint therebetween, and a cylindrical packing gland for the joint, the gland having a portion extending to a point well removed from the base of the packing chamber and having a relatively close fit on the pipe, and the casing having a portion extending to a point well removed from the base of the packing chamber to externally support and guide the gland for a substantial portion of its length; whereby the gland functions also as a guide for the pipe.

5. In combination in an expansion joint, a casing, a pipe telescopic therein, a packed joint therebetween, and a cylindrical packing gland for the joint, the gland having a portion extending to a point well removed from the base of the packing chamber and having a relatively close fit on the pipe, and the casing having a portion extending to a point well removed from the base of the packing chamber to externally support and guide the gland for a substantial portion of its length, whereby the gland functions also as a guide for the pipe, together with a piston guide for the pipe working in the casing.

6. An expansion joint comprising a casing, a pipe telescopic therein, and a guide for the pipe comprising a non-rotating head, a cylindrical surface for guiding the head, the guide head having diagonal ribs so angularly disposed that the surface over which each rib moves is approximately lapped by adjacent ribs on longitudinal movement of the parts thus preventing the wearing of grooves.

In testimony whereof I have hereunto signed by name.

G. F. MURPHY.